US012247392B2

(12) United States Patent
Czerkas

(10) Patent No.: US 12,247,392 B2
(45) Date of Patent: Mar. 11, 2025

(54) METHOD AND ARRANGEMENT FOR INSTALLING BUILDING PANELS

(71) Applicant: Robert William Czerkas, Seaford (AU)

(72) Inventor: Robert William Czerkas, Seaford (AU)

( * ) Notice: Subject to any disclaimer, the term of this patent is extended or adjusted under 35 U.S.C. 154(b) by 0 days.

(21) Appl. No.: 17/906,579

(22) PCT Filed: Mar. 17, 2021

(86) PCT No.: PCT/AU2021/050243
§ 371 (c)(1),
(2) Date: Sep. 16, 2022

(87) PCT Pub. No.: WO2021/184072
PCT Pub. Date: Sep. 23, 2021

(65) Prior Publication Data

US 2023/0131010 A1 Apr. 27, 2023

(30) Foreign Application Priority Data

Mar. 17, 2020 (AU) ................................ 2020900815

(51) Int. Cl.

*B66C 1/16* (2006.01)
*B66C 1/66* (2006.01)
*E04B 1/35* (2006.01)
*E04B 1/38* (2006.01)

(52) U.S. Cl.
CPC .............. *E04B 1/3511* (2013.01); *B66C 1/66* (2013.01); *E04B 1/383* (2013.01); *E04B 2001/3588* (2013.01)

(58) Field of Classification Search
CPC .................. E04B 1/3511; E04B 1/383; E04B 2001/3588; B66C 1/16; B66C 1/66; B66C 1/62
USPC ........................................................ 294/67.1
See application file for complete search history.

(56) References Cited

U.S. PATENT DOCUMENTS 2,636,770 A * 4/1953 Cornwell .................. B66C 1/48 294/103.1
3,897,097 A * 7/1975 Davis, Jr. ................ B66C 13/08 294/81.4
4,647,724 A * 3/1987 Stilwell ................... H04M 3/30 379/25

(Continued)

FOREIGN PATENT DOCUMENTS

AU 2008261157 B2 8/2011
BE 1017839 A3 8/2009

(Continued)

OTHER PUBLICATIONS

Supplementary Partial European Search Report, 12 pages Mar. 19, 2024.

(Continued)

*Primary Examiner* — Paul T Chin
(74) *Attorney, Agent, or Firm* — HESLIN ROTHENBERG FARLEY & MESITI P.C.

(57) ABSTRACT

A method for installing building panels, the method including forming a composite building panel from a plurality of panels, transporting the composite building panel to the site of installation and lifting the composite building panel by a lifting facility into position within a building.

16 Claims, 9 Drawing Sheets

(56) References Cited

U.S. PATENT DOCUMENTS

| | | | | | |
|---|---|---|---|---|---|
| 5,476,300 | A * | 12/1995 | Dodge | B66C 1/54 294/93 |
| 6,588,605 | B1 | 7/2003 | Volkert et al. | |
| 8,720,129 | B2 * | 5/2014 | Sias | E04G 21/142 52/125.2 |
| 9,469,510 | B2 * | 10/2016 | Phillip | B66C 1/24 |
| 10,625,987 | B1 * | 4/2020 | Hollowell | F16B 45/04 |
| 11,014,788 | B1 * | 5/2021 | Gentile | B66C 1/62 |
| 11,981,541 | B2 * | 5/2024 | Noveletsky | B66C 1/105 |
| 2010/0083590 | A1 | 4/2010 | Wochnik | |
| 2015/0308096 | A1 | 10/2015 | Merhi et al. | |
| 2016/0053502 | A1 | 2/2016 | Kristopher | |

FOREIGN PATENT DOCUMENTS

| | | | |
|---|---|---|---|
| CN | 107740530 | A | 2/2018 |
| CN | 105696744 | B | 5/2018 |
| EP | 0033942 | A2 | 8/1981 |
| GB | 604868 | A | 7/1948 |
| JP | S4997424 | A | 9/1974 |
| WO | 2014059463 | A1 | 4/2014 |
| WO | 2015050502 | A1 | 9/2015 |

OTHER PUBLICATIONS

International Search Report and Written Opinion of International Application No. PCT/AU2021/050243, mailed on Jun. 15, 2021, 13 pages.

* cited by examiner

METHOD AND ARRANGEMENT FOR INSTALLING BUILDING PANELS

PRIORITY CROSS-REFERENCE

This application is a U.S. National Phase filing under 35 U.S.C. § 371 of International Application PCT/AU2021/050243, filed Mar. 17, 2021, and published as WO 2021/184072 A1 on Sep. 23, 2021. PCT/AU2021/050243 claims priority from Australian Provisional Application No. 2020900815, filed Mar. 17, 2020. The entire contents of each of these prior applications are hereby incorporated herein by reference.

TECHNICAL FIELD

The present invention relates to a method and arrangement for installing building panels, such as exterior walls and in particular, panels that are inserted into wall cavities of buildings, for example to form partition walls. The present invention has been developed principally for the installation of autoclaved aerated concrete (AAC) panels (often known as "hebel" panels) that are inserted into wall cavities between adjacent commercial buildings or home dwellings as fire walls and/or insulation (sound and/or thermal) walls. It will therefore be convenient to describe the invention in relation to that application although it is to be appreciated that the invention can have application in other areas.

BACKGROUND OF INVENTION

The discussion of the background to the invention that follows is intended to facilitate an understanding of the invention. However, it should be appreciated that the discussion is not an acknowledgement or admission that any aspect of the discussion was part of the common general knowledge as at the priority date of the application.

AAC panels that are employed in the construction of commercial buildings or home dwellings can be supplied in a variety of shapes and sizes, but a popular size of panel used in the construction industry for partition walls has dimensions of 3000 mm×600 mm×50 mm and a weight of about 64 kgs. Panels of this size are positioned side by side and are edge glued together to form a partition wall of the required length. In Australia, up to 10 panels of this size can be glued together along adjacent edges before construction regulations require that a caulking joint is installed between a next group of panels.

Where the panels are to be employed in multi-level buildings, cranes can be employed to lift and place the AAC panels in upper floors. One method of installation involves constructing a crane in the form of an elevated rail or gantry on an upper level floor, in which the rail cantilevers out from the side of the building. A hoist that is supported on the rail can be driven to the end of the cantilever section of the rail and the hoist can lower a grip, clamp or hook to lift a panel upwards to the upper floor. It is normal for a supply of panels to be delivered to the construction site and placed on the ground adjacent the side of the building and so the rail is positioned to overlie the panels so that the hoist can be lowered directly to the panels. A construction worker would manipulate the grip, clamp or hook to engage the edge of a panel so it can be lifted.

Once a panel is lifted to the upper floor, the hoist can move back inboard along the rail to the general position at which the panel is to be installed and the hoist can lower the panel. Construction workers can guide the panel into place, or can disconnect the panel from the hoist and can arrange for the panel to be edge glued to an adjacent panel. This sequence is repeated until sufficient panels have been installed in position to form the partition wall and then the rail or gantry assembly is moved (which usually requires some disassembly) to the location of the next partition wall and construction of that wall commences in the same manner.

It will be appreciated that the method of panel installation described above involves the installation of individual panels and requires the hoist to move back and forward along the rail until the partition wall is complete. There is significant down-time for construction workers who are positioned at the panel lifting position and who connect the hoist to the panel, as well as for construction workers at the opposite end of the rail where the panel is lowered and disconnected for edge connection to an adjacent panel. But these construction workers cannot work at both ends of the rail given that they are on different levels of the building. Moreover, the rail or gantry is positioned for the particular partition wall being constructed and once that partition wall is complete, the method requires relocation of the rail or gantry for installation of the next partition wall. This usually requires at least partial disassembly of the rail or gantry for relocation. This adds to the down-time that this particular method experiences.

It is an object of the present invention to provide an alternative method for the installation of partition walls.

SUMMARY OF INVENTION

According to the present invention there is provided a method for installing building panels, the method including forming a composite building panel from a plurality of panels, transporting the composite panel to the site of installation and lifting the composite panel by a lifting facility into position within a building.

The present invention advantageously reduces by a significant amount, the time taken on site to install a partition wall. For example, an installation that might take 4 to 5 days by the prior art method described above, could take 0.5 to 1 day by the present invention. To achieve this, the present invention removes the requirement for a partition wall to be constructed on site, one panel at a time and allows multiple pre-connected panels to be installed at one time in one lift. For example, a composite panel can be formed of 10 separate panels and lifted into place as one unit rather than 10 separate panels being lifted into place separately and one after the other. The time taken for installation thus can be reduced given that only one crane movement is required for the 10 panel composite panel, rather than 10 separate crane movements for 10 separate panels.

A composite panel formed of 10 separate panels is considered by the applicant as one size of panel that will be suited to the method of the invention. As indicated above, in Australia, up to 10 panels of 3000 mm (or different height)×600 mm can be glued together along adjacent edges before construction regulations require that a caulking joint is installed between a next group of panels. So where those regulations apply, the invention would employ composite panels of up to 10 panels. However, where those regulations do not apply, the composite panel may comprise more than 10 panels.

The time saving aspect of the present invention is provided mainly by forming a composite building panel from a plurality of panels off-site. These composite panels can thus be formed in a factory environment for example, for transport to the site of installation. Formation of the composite panels in a factory environment allows the panels to be constructed in a controlled environment so that, for example, there are no interruptions to construction by weather. A factory can run at night and is more readily automated than an installation site. Moreover, in a controlled environment, the connections between panels can be carefully controlled so facilitating consistency of connection and flaws in the panels or in a constructed composite panel might be more readily evident and more easily rectified.

The composite panels formed at one site could also be transported to various different building sites, so that skilled operators used to create the composite panels can be employed at the factory site only and might not necessarily be required at each installation site. Gluing equipment and supplies can also be provided at the factory site and not at each installation site, as can other equipment that is solely used for composite panel construction.

The composite panels can be customised to suit the specific requirements of the different building sites, including that the composite panels may include different numbers of panels and the panels of one composite panel might be of different dimensions to other composite panels. The panels within a composite panel may have different dimension, for example width (side edge to opposite side edge) dimensions, to achieve a particular overall length of composite panel, or they may include fittings and openings as might otherwise be added/created on site.

The pre-formed composite panels can be transported to the installation site in any suitable manner, but the applicant has developed framework or racking to properly support multiple composite panels for transport in containers or on flat bed trucks for example. The racking includes a slotted or channeled base for receipt of the bottom edge of a composite panel and at least one, but preferably two slotted sides for supporting the side edges of a composite panel. The composite panels are intended to be supported standing up in the racking on the bottom edge thereof and with the broad plane of the composite panels extending generally vertically, and adjacent composite panels are intended to be stacked close together in facing relationship. The racking preferably supports the respective composite panels slightly spaced from each other so that the grabbing portion of a lifting facility can enter the space between panels and grab the upper edge region of a panel. The slight spacing can be facilitated by spacers that fit between adjacent composite panels to keep them slightly apart. The spacers might be provided at the upper edge region of the panels with the bottom edge of the panels being spaced apart by the slotted base.

Suitable spacers can be in the form of a bracket or a plurality of brackets that are applied along the top edge of a composite panel, or at the top edge of adjacent composite panels and which have a part or component that extends into the space or gap between adjacent composite panels to maintain them spaced apart. The bracket or brackets can also support the connection at the joint or junction between individual panels of each composite panel. Thus, the bracket or brackets can protect the integrity of the glue connection between the adjacent panels of the composite panels by resisting flexing or pivoting movement of the composite panels about the joint or junction between individual panels. The bracket or brackets can be particularly useful to support the individual panels that are inboard of the panels at the opposite edges of a composite panel and which are not supported by the side edge channels of the racking.

One bracket or set of brackets can be fixed to each of the front and rear composite panels within the racking and further brackets can interact with the composite panels intermediate the front and rear composite panels and those further brackets can interlock with the fixed brackets to secure the intermediate composite panels spaced apart relative to themselves and to the front and rear composite panels.

The brackets can take any suitable form. In some forms, the brackets include one or a pair of legs that extend downwardly from the upper edge of a composite panel. In brackets to be fixed to each of the front and rear composite panels, the legs include openings for fixing to the front face of the composite panels and the openings can be formed in plates that are attached to the legs. These brackets can include a top plate that connects to the upper ends of the legs and that extends in use along the upper edge of the composite panel.

Brackets that are formed for interaction with the composite panels intermediate the front and rear composite panels do not need to be fixed to the front face of the composite panels, but rather, can interlock with the fixed brackets. Those brackets will also include one or a pair of legs that extend downwardly from the upper edge of a composite panel. The interlocking arrangement can secure all of the brackets together and the fixing of the brackets to the front and rear composite panels secures all of the brackets to the set of composite panels in the racking.

Alternatively or additionally, a spacing member, such as a length of timber or an elongate metal bracket or batten can be placed and fixed between adjacent composite panels to extend substantially the full length of the composite panels. Such a spacing member can be inserted between each adjacent composite panel that is loaded into the racking. The spacing member can be fixed in place against a composite panel by inserting screw fasteners that extend through the composite panel and into the spacing member.

The use of spacing members between adjacent composite panels in the racking can provide a significant benefit for the later installation of the composite panels in a building. By attaching battens to the composite panels 10 as they are formed in the racking, those battens can be used in the fixing of the composite panels within a building framework. That is, battens can be used to attach composite panels to the studs of building framework and so the attachment of battens to the composite panels as they are formed means that the subsequent attachment on site is not required.

The method of attaching battens can be to temporarily attach one or more battens to one side of an already formed or first composite panel that is held in the racking. The temporary attachment can be by adhesive tape for example. Then the next and second composite panel can be formed adjacent the first composite panel with the temporarily attached battens now located between the first and second composite panels. The batten or battens are thus located between the two adjacent composite panels. Fasteners can then be driven through the second composite panel and into the battens to permanently connect the battens to the second composite panel. The fasteners will be driven through the second composite panel from the opposite side of the composite panel to the side on which the battens are to be fixed. Once a suitable number of fasteners are driven through the second composite panel and into the battens to secure them in place, new battens can be temporarily attached, such as by adhesive tape, to the opposite side of the second composite panel and a further (third) composite panel can be formed adjacent the second composite panel.

The process is repeated to drive fasteners through the third composite panel and into the battens between the second and third composite panels to secure the battens to the third composite panel. Subsequent composite panels are formed and battens secured in the above manner.

When the composite panels are removed from the racking, the mechanism used to temporarily attach battens to one side of the composite panels can be such as to be destroyed. Thus, where an adhesive tape is used to temporarily attach battens to one side of the composite panels, this can tear off the composite panel surface, leaving the battens securely attached by the screw fasteners to the adjacent composite panel.

The racking can of course take different forms and for example could support composite panels on an angle to vertical, could support only one side edge of a composite panel rather than both side edges, or could support the composite panels horizontally.

The racking can include tyre openings for forklift tynes to enter so that the racking can be moved about and loaded onto transport by forklift.

The method of the invention is particularly suitable for the installation of AAC panels into partition wall or building cavities, such as fire walls between adjacent apartments or offices. In some forms of the invention, the method provides for lifting the composite panel by a lifting facility into a cavity within a budding.

The method of the invention generally will employ AAC panels for construction of a composite panel, that have a greater height than width, eg 3000 mm high×600 mm wide. Various panel thicknesses are available including 50 mm, 75 mm and 100 mm. The panels are generally planar and have broad front and rear surfaces. The composite panel will be formed with adjacent panels connected together along edges thereof, typically by gluing. Interfitting or interlocking edge profiles can be employed to properly located adjacent edges together. The method of the invention thus involves arranging a first panel in a first position and arranging a second panel in a second position so that a side edge of the first panel is adjacent a side edge of the second panel and moving the second panel relative to the first panel to engage the adjacent side edges of the first and second panels so that the first and second panels are generally co-planar. The method further involves maintaining the adjacent side edges of the first and second panels in contact so that a glue layer between the adjacent side edges can cure and connect the adjacent side edges together. The glue layer can be pre-applied to one of the side edges of one of the first and second panels, so that the glue is present on the panel edge prior to placement of the panel adjacent to another panel, so that the method also includes the application of a glue layer to a side edge of a panel prior to side edges of adjacent panels being brought together for glued edge connection.

The method of the invention can be repeated to add further panels in co-planar edge connection with the first and second panels. The method of the invention can thus involve arranging a third panel in a third position so that a side edge of the third panel is adjacent a side edge of the second panel and moving the third panel relative to the second panel to engage the adjacent side edges of the second and third panels so that the second and third panels are generally co-planar and maintaining the adjacent side edges of the second and third panels in contact so that a glue layer between the adjacent side edges can cure and connect the adjacent side edges together. As indicated above, up to 10 panels of 3000 mm (or different height)×600 mm can be connected together under Australian construction regulations to form a composite panel of approximately 3000 mm×6000 mm for use in cavity walls.

The arrangement of the panels and their edge connection all takes place off-site and before the pre-formed composite panels are transported to the site of installation. At the site of installation, a crane can lift the composite panels into place so that each crane movement installs a composite panel of say up to 10 panels, rather than each crane movement installing a single panel as in the prior art discussed above.

The method of the invention can also involve constructing the composite panels with fittings, such as framework, conduits or openings, Advantageously, these fittings can be pre-formed off-site so that no time is required during installation of the composite panel to provide or create these fittings. The method of the invention can also involve the application of surface finishes to the composite panel, such as paint for aesthetic purposes, or waterproofing or mould resistance coatings. The method of the invention is thus intended to conduct as much of the construction of the composite panels as possible in the off-site location so as to minimise the amount of construction or treatment of the composite panels on-site.

The method of the invention can also employ the racking discussed above, or alternative racking or framework, for the manufacture or assembly of the composite building panel. Thus, the method can involve a first panel being positioned and supported in racking or a frame, a second panel being positioned and supported in the racking or frame adjacent the first panel and moving the second panel relative to the first panel guided by the racking or frame to engage the adjacent side edges of the first and second panels and maintaining the adjacent side edges of the first and second panels in contact so that a glue layer between the adjacent side edges can cure and connect the adjacent side edges together. Third and subsequent panels can be positioned and moved in the racking or frame in the same manner to construct a composite building panel of any number of individual panels. An overhead mobile gantry can be used to lift and place the panels into the racking or frame for glue connection between them.

The present invention also provides a lifting assembly for lifting a composite building panel into place in a building structure. The lifting assembly can include a lifting bar that attaches across the top or upper edge region of a composite panel and that can be connected or hitched to a lifting facility, such as a crane or hoist. The present invention can also provide a lifting bar separately to a lifting assembly. In some forms of the invention, the lifting bar is formed into a U-shape to fit over and receive the top or upper edge region of a composite panel. The lifting bar can thus have an elongate base and depending side walls, that have an internal spacing slightly greater than the thickness of the composite building panel that the lifting bar is to be used with. In use, the elongate base can be in facing relationship with the top edge of the composite building panel and can rest against the top edge or can be spaced slightly above the top edge. The width of the base perpendicular to the length of the base can be about the same as the width of the top edge of the composite building panel, or it can be slightly greater than the width.

To attach the lifting bar to the composite panel, one or both of the side walls can have openings or perforations to receive screws that are temporarily drilled into the top or upper edge region of the composite panel. Once the composite panel has been positioned in place in the building, the screws can be removed and the lifting bar detached from the top or upper edge region of the composite panel.

The lifting bar can take other forms and in one form, it is formed into a U-shape with an elongate base and depending side walls as described above, but further includes attachment members that extend from one or both of the side walls and that have openings or perforations to receive screws that are temporarily drilled into one of both of the sides walls of the composite panel adjacent the top or upper edge region of the composite panel. The attachment members can be spaced apart sections or fingers, or downwardly extending plates or drop plates, that extend from one or both of the side walls. The arrangement can be such as to provide one attachment member per panel of the composite building panel, so that a lifting bar configured fora 10 panel composite building panel will have 10 attachment members, while a lifting bar configured for a 5 panel composite building panel for example, will have 5 attachment members. The attachment members can be arranged so that they overlie a front and/or rear surface of a panel of the composite building panel at about the middle of the front and/or rear surface between the side edges of the panel. The attachment members can be connected to the side wall or walls of the lifting bar such as by welding, or the attachment members can be integral with the side wall or walls, such as by laser cutting the side walls to include the attachment members.

Alternatively, the lifting bar can have an elongate base and depending attachment members that extend from the base and that have openings or perforations to receive screws that are temporarily drilled into one of both of the side walls of the composite panel adjacent the top or upper edge region of the composite panel. The attachment members can comprise spaced apart sections or fingers, or downwardly extending plates or drop plates, that extend from one or both of the elongate side edges of the base.

A lifting bar that is configured for a 10 panel composite building panel can still be employed with a 5 panel composite building panel and so it is not necessary to construct a separate lifting bar for each size of composite panel. However, it is not expected to be acceptable to apply a lifting bar configured for a 5 panel composite building panel to a 10 panel composite building panel, as the lifting bar configured for a 5 panel composite building panel may not have sufficient purchase on the 10 panel composite building panel to lift it and those panels of the 10 panel composite building panel that are not attached to attachment members of the lifting bar may not be sufficiently supported by the lifting bar against breakage of the connections between panels that are attached to attachment members of the lifting bar.

The lifting bar can include facility for engagement by a crane or other lifting device or appliance. In some forms of the invention, the lifting bar includes lifting lugs, such as attached or integral with the base of the lifting bar, so that the lugs project upwardly from the lifting bar when the lifting bar is fitted to the top or upper edge region of a composite panel. A pair of spaced apart lifting lugs can be provided. The lugs or lugs can be attached to lifting chain, rope or the like and extend to a connection, such as a lifting ring or hook that can be connected to a crane or other lifting device or appliance.

The lifting bar can be permanently attached to the crane or other lifting device or appliance and lowered on-site into connection with the top or upper edge region of each composite building panel to be installed.

Panels formed according to the invention can be connected to the frame of a building such as by the use of L-Brackets, or they can be screwed into top hat channels which have been pre applied to the frame or to a wall within the building.

BRIEF DESCRIPTION OF THE DRAWINGS

In order that the invention may be more fully understood, some embodiments will now be described with reference to the figures in which.

DETAILED DESCRIPTION OF THE DRAWINGS

Figure 1:
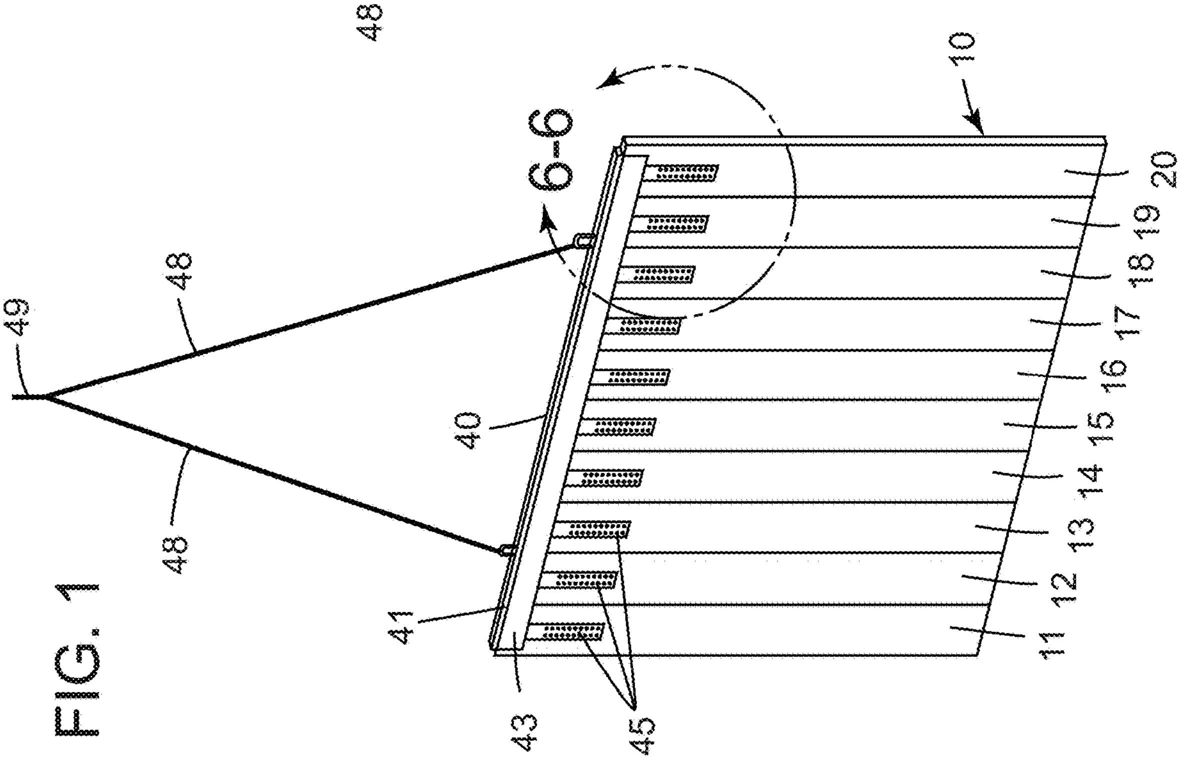
FIG. 1 illustrates a composite building panel in perspective view according to one embodiment of the present invention.

FIG. 1 illustrates a composite building panel 10 which is formed from a plurality of 10 individual separate panels 11 to 20. Each of the panels 11 to 20 has dimensions of 3000 mm×600 mm and typically, the invention will employ AAC panels, which are sometimes known as "hebel" panels. The panels shown in FIG. 1 typically have a thickness of 50 mm.

The panels 11 to 20 are connected along adjacent side edges by a glue connection. The method of gluing the panels 11 to 20 together can take any suitable form, but typically, firstly, a glue layer is applied to a side edge of the panels 11 and 12 and thereafter they are brought together so that respective side edges of the panels 11 and 12 are in facing relationship and then the panels 11 and 12 are moved relative to each other to bring the side edges into engagement. In that engaged state, the glue layer between the side edges can connect those edges together and so connect the panels together. The glue layer can be pre-applied to side edges of the panels 11 to 20 prior to the panels being brought together for connection, or part of the connection process can include the application of a glue layer just prior to the panels being brought together. The glue layer can be applied to just one of the side edges of each panel, or to both of the side edges of each panel. Where the glue layer is pre-applied to the side edges, the layer might be overlaid by a protective sheet or strip, so that the layer is not contaminated by airborne matter, such as dust or moisture prior to the panels being connected along facing side edges, and as part of the assembly process, the protective sheet or strip can be removed.

With panels 11 and 12 secured in edge connection, subsequent panels 13 to 20 can be connected together and to panel 12 in the same manner to form the composite panel 10 as shown in FIG. 1. As shown, the composite panel is a planar panel which has an approximate dimension of 3000 mm×6000 mm.

It will be appreciated that a greater number of panels can be connected together to form a composite panel of greater length, or lesser number of panels can be connected together to form a reduced length composite panel. Accordingly, composite panels formed of just two panels can be formed, as can a three panel composite panel, a four panel composite panel and so on.

FIG. 1 also illustrates a lifting facility that includes a lifting bar 40 and lifting chains 48 and 49, the construction and operation of will be described later herein.

Figure 2:
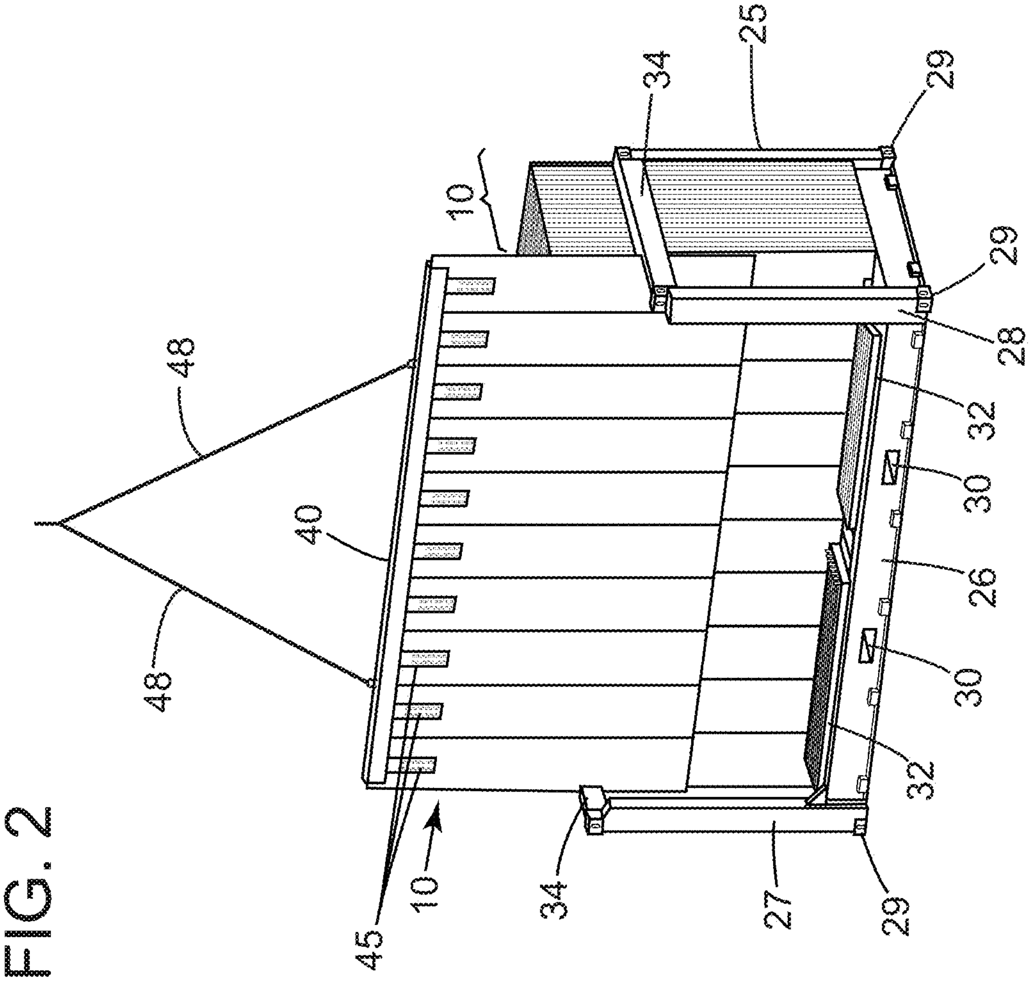
FIG. 2 illustrates a plurality of composite building panels in supporting framework or racking.

FIG. 2 illustrates racking or framework that can be employed in the manufacture of a composite building panel 10 and which can also be used in the transport of composite panels between the site of manufacture and the site of installation. The frame 25 shown in FIG. 2 is shown supporting a plurality of composite panels 10, with one of the panels 10 being lifted by the lifting facility 40 as will be described later herein.

The frame 25 includes a base 26 and sides 27, 28. The base 26 rests on four feet 29 so that the base is slightly elevated above the ground and the base 26 includes tyne openings 30 for accepting forklift tynes for placement of the frame 25.

The base 26 includes a series of slots or channels 32 (see FIG. 5 in particular) for receipt of a bottom edge of each composite panel 10. Moreover, the horizontal bars 34 of the sides 27 and 28 include inwardly facing slots or channels, which align vertically with the slots/channels 32 of the base, so that opposite side edges of the composite panels 10 are also captured within a slot or channel of the bars 34. In this manner, the composite panels 10 are secured within the frame 25 and are slightly spaced apart an amount equivalent to the thickness of the walls that form the slots or channels 32 within the base 26. Horizontal beams are intended to extend between the sides 27 and 28, across the front of the composite panels 10.

The frame 25 can be used in the manufacture of the composite panels 10, by successively introducing individual panels 11 to 20 into the frame 25 in sequence, so that a first panel 11 is placed so that the base of the panel 11 is inserted into a slot or channel 32 and the side edge of the panel 11 is placed in engagement with one of the sides 27 or 28 and is captured in a slot of the relevant side which is vertically above the slot or channel 32 in which the base of the panel 11 is inserted. A second panel 12 is then introduced into the frame 25 by inserting the base of that panel 12 into the same slot or channel 32 of the first panel 11 and then the second panel 12 is moved toward the first panel 11, so that adjacent side edges of the first and second panels 11 and 12 engage and so that a glue layer between the engaged side edges will connect the side edges and thus the panels 11 and 12 together. The first and second panels 11 and 12 are coplanar by virtue of their respective bases being inserted into the same slot or channel 32 and by the side edges being brought into alignment. The first and second panels 11 and 12 can have interfitting or interlocking edge profiles to assist to join and align the panels 11 and 12. The subsequent panels 13 to 20 can all be introduced in the same manner until all 10 panels are in place with adjacent edges in glued engagement. It will be appreciated, that at least the final panel 20 will need to be lowered vertically into position, so that its side edge can be captured in a slot or channel of the relevant side 27 or 28. If the frame 25 provides a tight fit between the 10 panels 11 to 20, then the final panel 20 may be lowered with the adjacent side edges between the ninth panel 19 and the tenth panel 20 being in sliding engagement.

Otherwise, the distance or spacing between the inwardly facing slots or channels of the horizontal bars 34 of the sides 27 and 28 can be spaced apart a greater amount than the length of the composite panel 10 between the opposite side edges of the panels 11 and 20, to allow the tenth panel 20 to be inserted without sliding contact with the side edge of the ninth panel 19 and allowing the panel 20 to be moved toward the ninth panel 19 and into glued side edge engagement with the ninth panel 19.

Multiple composite building panels 10 can thus be formed within the frame 25 in the manner described above. In FIG. 2, there remain several slots or channels 32 for additional composite panels 10 to be manufactured and once all of the slots or channels 32 are filled, or once enough of those slots or channels 32 have been filled for a particular job, the manufacturing process can finish.

The glue connecting the panels 11 to 20 of the composite panels 10 as loaded into the frame 25 can be left to cure and this might, for example, take 24 hours. The frame 25 might be tilted slightly during the curing process to urge the panels 11 to 20 towards each other to assist proper edge connection between the panels 11 to 20.

The frame 25 can be lifted by a forklift into a shipping container, or onto a flat bed truck or the like, for transport to an installation site. At the installation site, the composite building panels 10 can be unloaded from the frame 25.

Returning to FIG. 1, a lifting bar 40 is shown attached across the top or upper edge region of the composite building panel 10. The lifting bar 40 is part of a lifting assembly for lifting composite panels, either from the frame 25 of FIG. 2, or from other storage containers or assemblies that might be provided for storing and transporting composite building panels.

Figure 3:
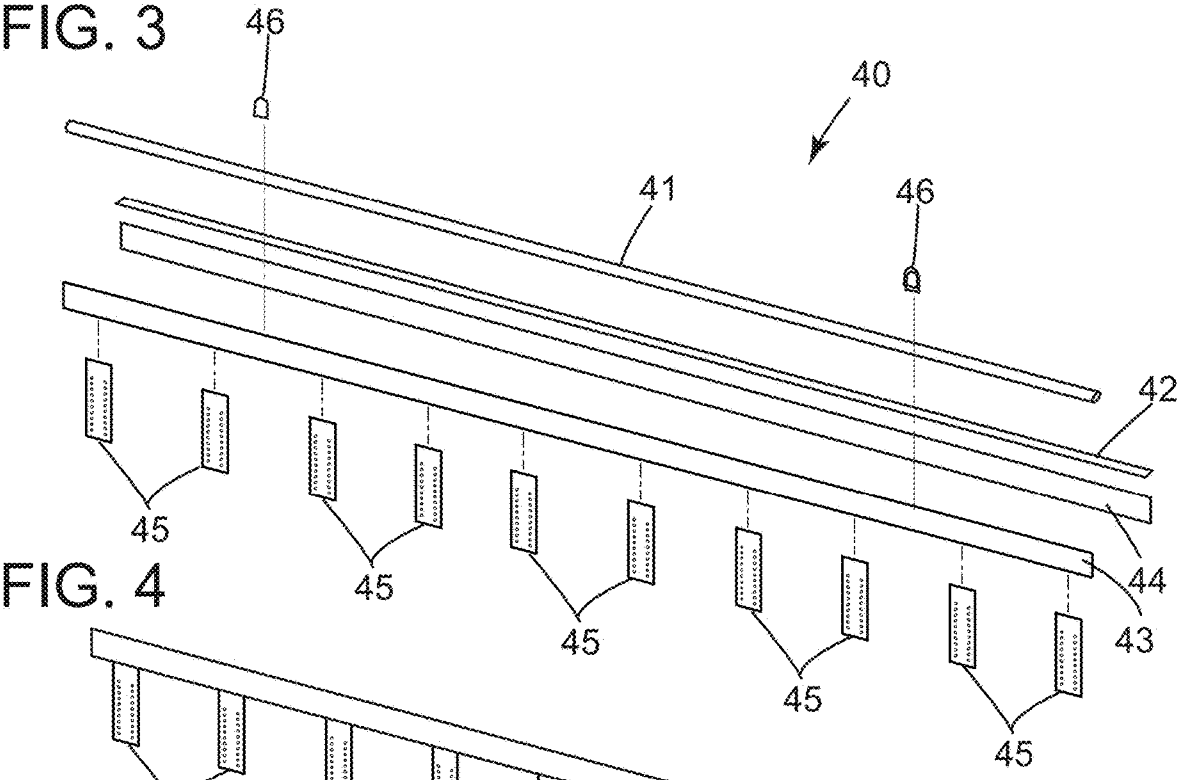
FIG. 3 is an exploded view of a lifting bar according to one embodiment of the present invention.

The lifting bar 40 is shown in exploded view in FIG. 3 and comprises a top RHS bar 41, a top plate 42, a pair of side walls 43, 44 and a plurality of drop plates 45 that are for attachment to and extension downwardly from the side wall 43. FIG. 1 shows the lifting bar 40 from the side that shows the side wall 43 and the drop plates 45, so that the opposite side wall 44 is not visible.

The lifting bar 40 further includes a pair of lifting lugs 46 (see FIG. 6) for attachment, as shown in FIG. 1, to a lifting chain, rope or the like 48 whereby a pair of lifting chains 48 extend from each of the lifting lugs 46 to a central lifting chain 49 which connects to a lifting facility, such as a crane, hoist or the like. The lifting chains 48 can be permanently connected to the lifting lugs 46, so that the lifting bar 40 is permanently attached to the crane or hoist or the like.

Returning to FIG. 3, each of the components of the lifting bar 40 is welded in place, so that the drop plates 45 are butt welded to the side wall 43, and the side walls 43 and 44 are welded to the top plate 42. The bar 41 is welded to the plate 42 and the lugs 46 are welded to the bar 41. In alternative arrangements, such as shown in FIG. 4, the side wall 43 and the drop plates 45 can be laser cut for example, so that they are formed integrally.

Figure 5:
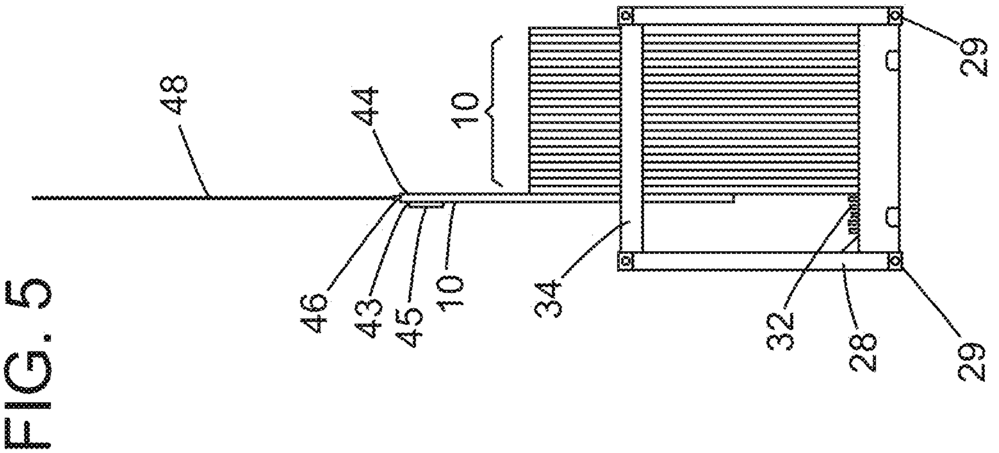
FIG. 5 is a side view of the arrangement of FIG. 1.

The lifting bar 40 is thus formed into a U-shape to fit over and to receive the top or upper edge region of the composite panel 10, For lifting the composite panel 10, the lifting bar 40 can be lowered onto the top or upper edge region so that the side wall 43 and drop plates 45 are in close facing relationship with one surface of the composite panel 10 and the side wall 44 is in close facing relationship with the surface of the composite panel 10 on the opposite side. The side view showing this arrangement is illustrated in FIG. 5. A close up perspective view of this arrangement is shown in FIG. 6.

Figure 6:
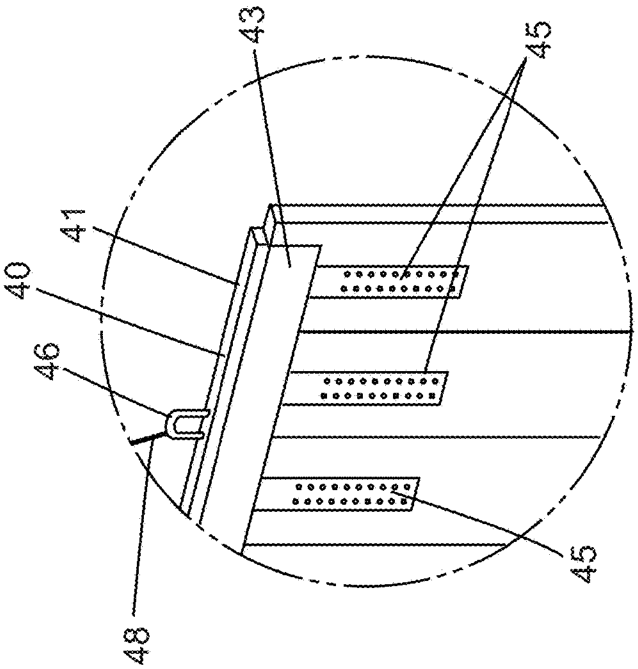
FIG. 6 is a detailed view of a corner of the composite budding panel of FIG. 1.
Figure 4:
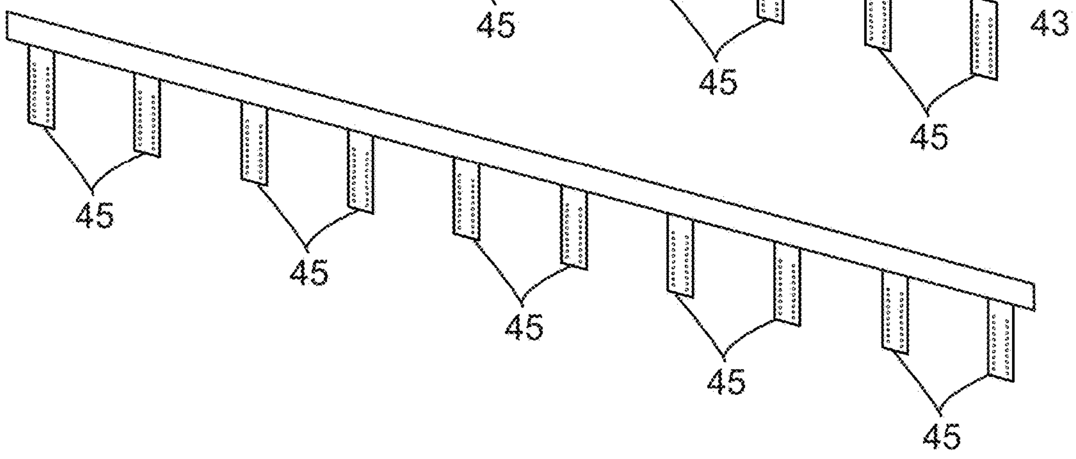
FIG. 4 illustrates a component of a lifting bar.

FIGS. 3, 4 and 6 clearly show perforations or openings formed in each of the drop plates 45, These are provided to accept screws that can be screwed into the composite panel 10 through the drop plates 45. The screws will be temporary screws such as tek screws to secure the lifting bar 40 to the composite panel 10. 50 mm screws can be used for a 50 mm thick panel, while 65 mm screws can be used for a 75 mm thick panel. The screws will not screw fully across the wall thickness of the panels, because the drop plates 45 will have a thickness of approximately 10 mm. It is anticipated at this stage, that about three or four screws will be screwed through each of the drop plates 45 into the composite panel 10, It will be appreciated from the figures, that they show a larger number of perforations in each of the drop plates 45 than are required to accommodate three or four screws, but this simply illustrates the availability of a greater number of openings or perforations for a greater number of screws as might be required.

Figure 8:
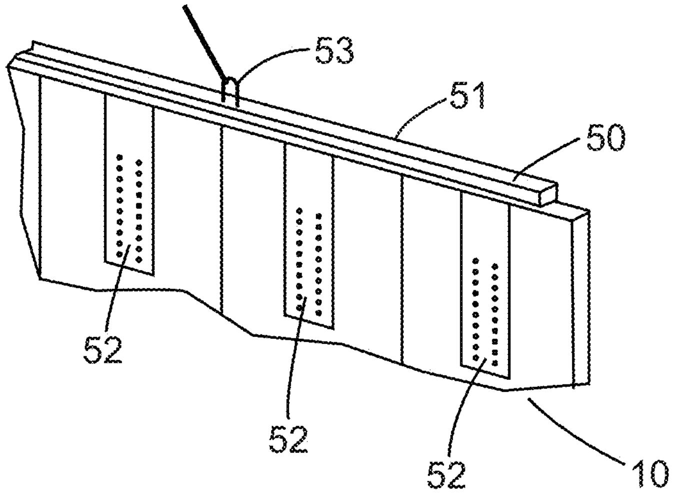
FIG. 8 is a detailed view of a corner of the composite building panel of FIG. 7.
Figure 7:
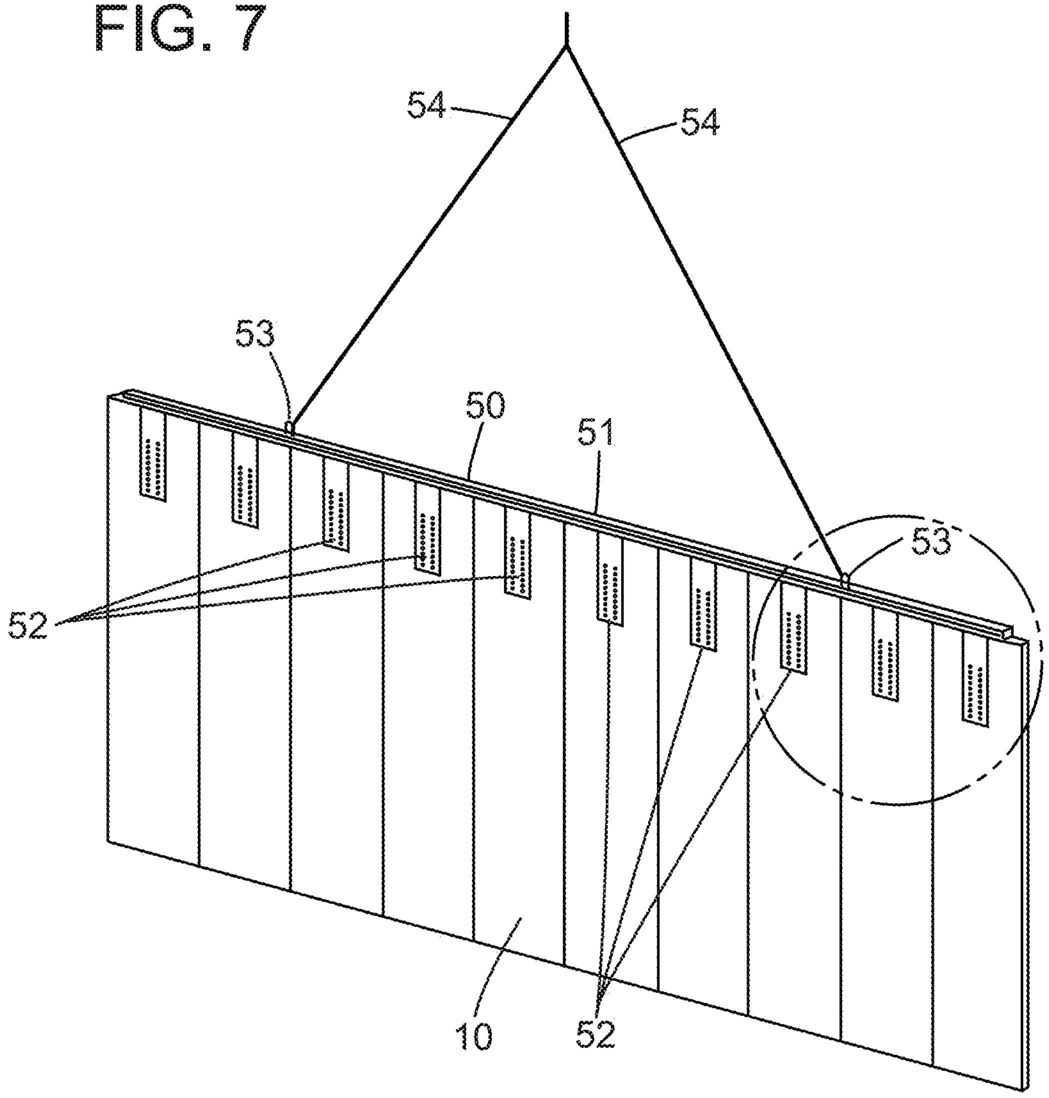
FIG. 7 illustrates a lifting bar attached to a composite building panel according to another embodiment of the present invention.

The lifting bars 40 each include a pair of side walls 43 and 44. However, the lifting bar 40 can be formed without the side walls 43 and 44 and an example of an alternative lifting bar 50 is shown in FIGS. 7 and 8. In those figures, the lifting bar 50 includes a top bar 51 and a top plate beneath the bar 51 (which is not visible in FIGS. 7 and 8), and a plurality of drop plates 52 that are welded to the top plate. The drop plates 52 are longer than the drop plates 45 so that the total length of the drop plates 52 is approximately equal to the combined length of the side wall 43 and drop plates 45 of the earlier figures.

Otherwise, the lifting bar 50 is substantially the same and operates in the same manner as the lifting bar 40 whereby perforations or openings are provided in the drop plates 52 for receipt of screws and lifting lugs 53 are attached to the top bar 51 for attachment to a lifting chain 54 to attach to a lifting facility such as a crane.

A further alternative lifting bar is one that does not include the top plates that are described as being included in the lifting bars 40 and 50 so that the connection between the side walls and/or the drop plates is to the top bars.

Figure 11:
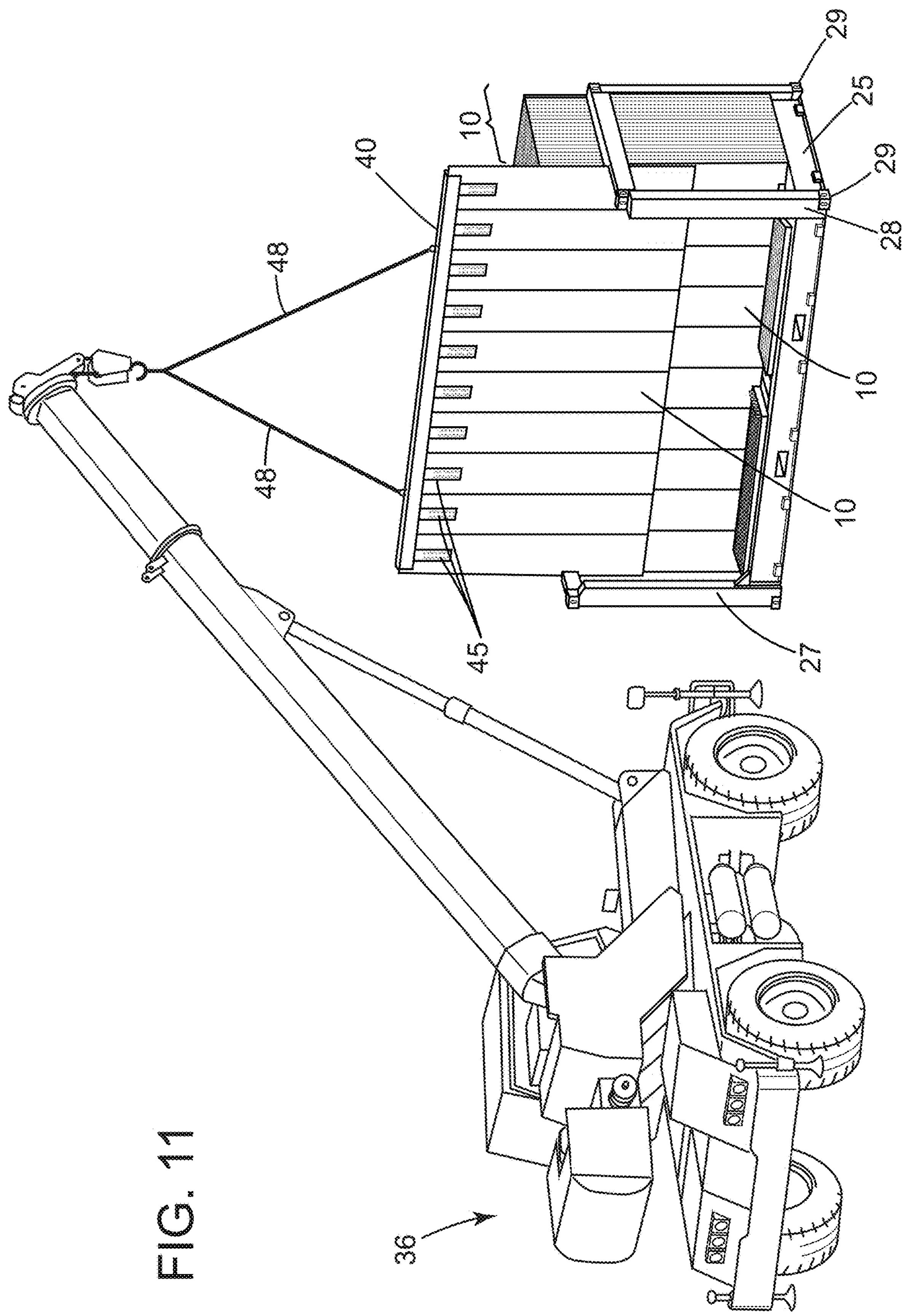
FIG. 11 illustrates a crane that is lifting a composite building panel from the supporting framework or racking of FIG. 2, FIGS. 12 and 13 illustrate a slightly different form of supporting framework or racking.

With reference to FIG. 2, the method of lifting a composite building panel 10 is by lowering the lifting bar 40 onto the top or upper edge region of a composite panel 10, inserting screws through the perforations of the relevant drop plates 45, and then lifting the composite panel 10 via the lifting chains, rope or the like 48 and 49. FIG. 2 shows one of the stack or group of the composite panels 10 being lifted in this manner. FIG. 11 shows a similar view to FIG. 2 but also illustrates a mobile crane 36 that is lifting the panel 10. The mobile crane 36 is one form of lifting facility for use in the invention. The composite panel 10 would be lifted by the crane 36 from the frame 25 as shown in FIGS. 2 and 11 and placed within a building where required, and then the screws would be removed from the drop plates 45 to free the lifting bar 40 from the top or upper edge region of the composite panel 10. The composite panel 10 is then free to be maneuvered within the building for installation while the bar 40 can then be returned by the lifting facility (the mobile crane 36 in FIG. 11) back to the frame 25 for lowering over the top or upper edge region of the next composite panel 10. Once the lifting bar 40 is lowered to accept the top or upper edge region of the next composite panel 10, screws can be inserted through the perforations or openings in the drop plates 45 and the next composite panel 10 can then be lifted for placement within the building.

Figure 9:
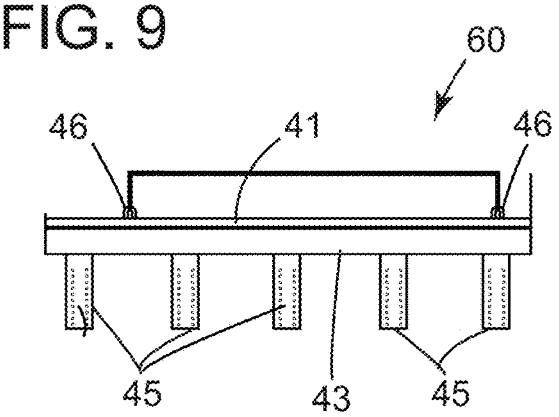
FIGS. 9 and 10 illustrate alternative lifting bars.
Figure 10:
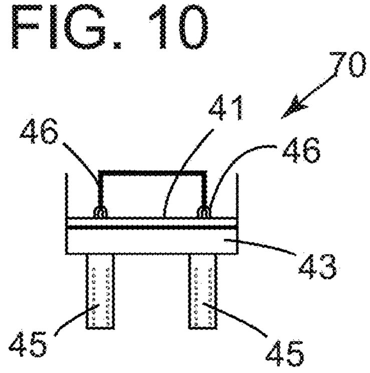

The lifting bars 40 and 50 shown in FIGS. 1 and 7 each include facility for connection to 10 individual panels, the facility being provided in FIGS. 1 and 7 by the drop plates 45 and 52 respectively. However, where composite building panels are to be manufactured or constructed with less individual panels, shorter length lifting bars can be used. FIGS. 9 and 10 for example show lifting bar 60 and 70 for use with composite panels manufactured from five individual panels and two individual panels respectively. In all other respects, the lifting bars 60 and 70 are manufactured in the same manner as the lifting bar 40 so that they include the same components as shown in the exploded view of FIG. 3, but the length of the top bar 41, the top plate 42 and the side walls 43 and 44 is reduced. Moreover, the number of drop plates 45 is also reduced. Also, while each of the lifting bars 60 and 70 include lifting lugs, the lifting lugs are spaced closer together than in the lifting bars 40 and 50, For convenience, the same parts that are employed in the lifting bars 60 and 70 as are employed in the lifting bar 40, have the same reference numerals despite that the length dimensions might be different.

Figure 12:
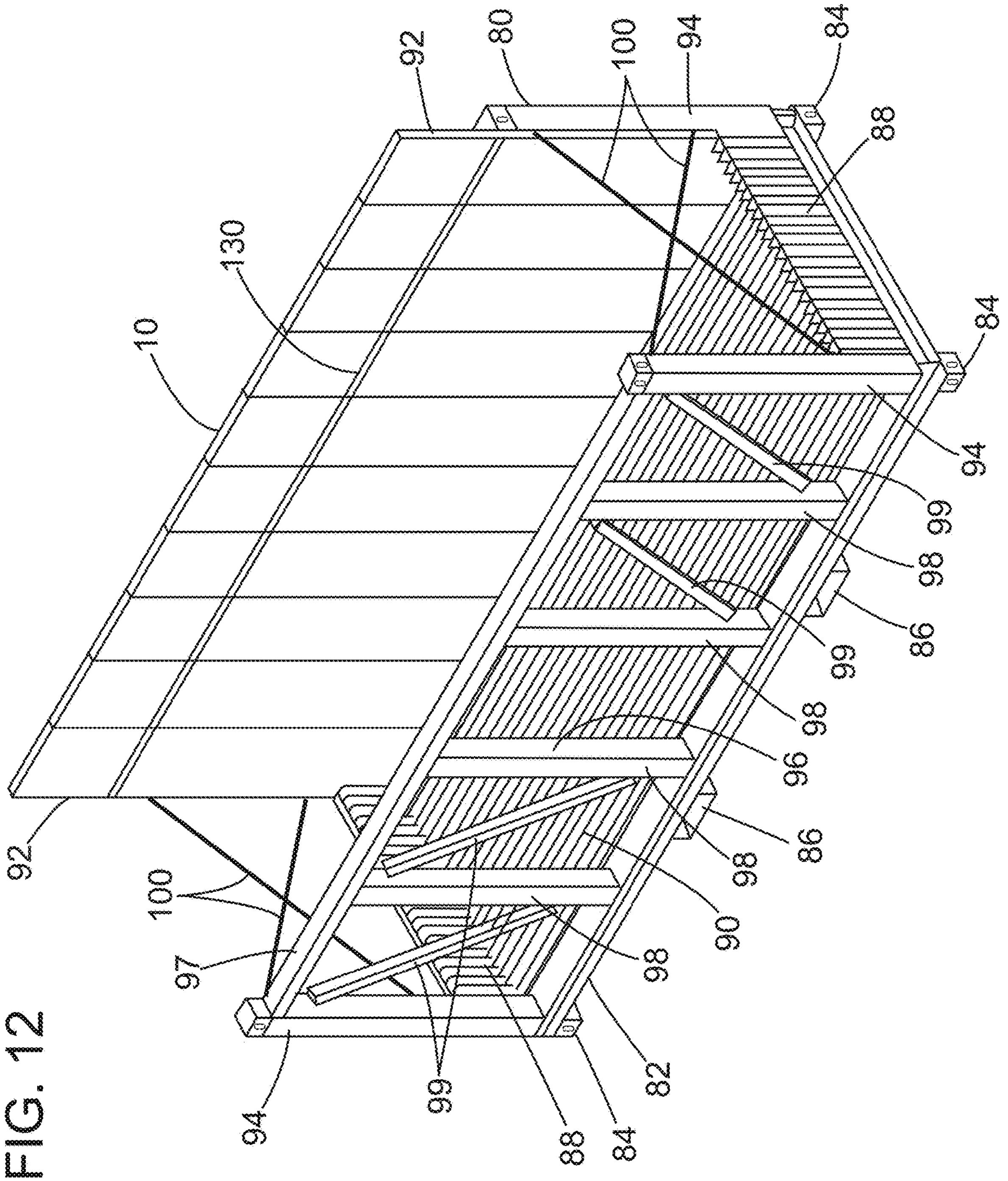

An alternative frame 80 that can be employed in the manufacture of a composite building panel 10 and which can also be used in the transport of composite panels between the site of manufacture and the site of installation is shown in FIG. 12. The frame 80 shown in FIG. 12 is shown supporting a single composite panel 10 of the kind described hereinbefore. The frame 80 has a base 82 that rests on four feet 84 (only three of which are visible in FIG. 12) so that the base 82 is slightly elevated above the ground and the base 82 includes tyne openings 86 for accepting forklift tynes for lifting and placement of the frame 80. Like the frame 25, the frame 80 includes a series of slots or channels 88 and 90 for receipt of the bottom and side edges of the composite panel 10. The channels 88 are formed for receipt of the bottom portions of the opposite side edges 92 of the composite panel 10, while the channels 90 extend along the base 82 and are formed for receipt of the bottom edge (obscured in FIG. 12) of the composite panel 10.

Figure 13:
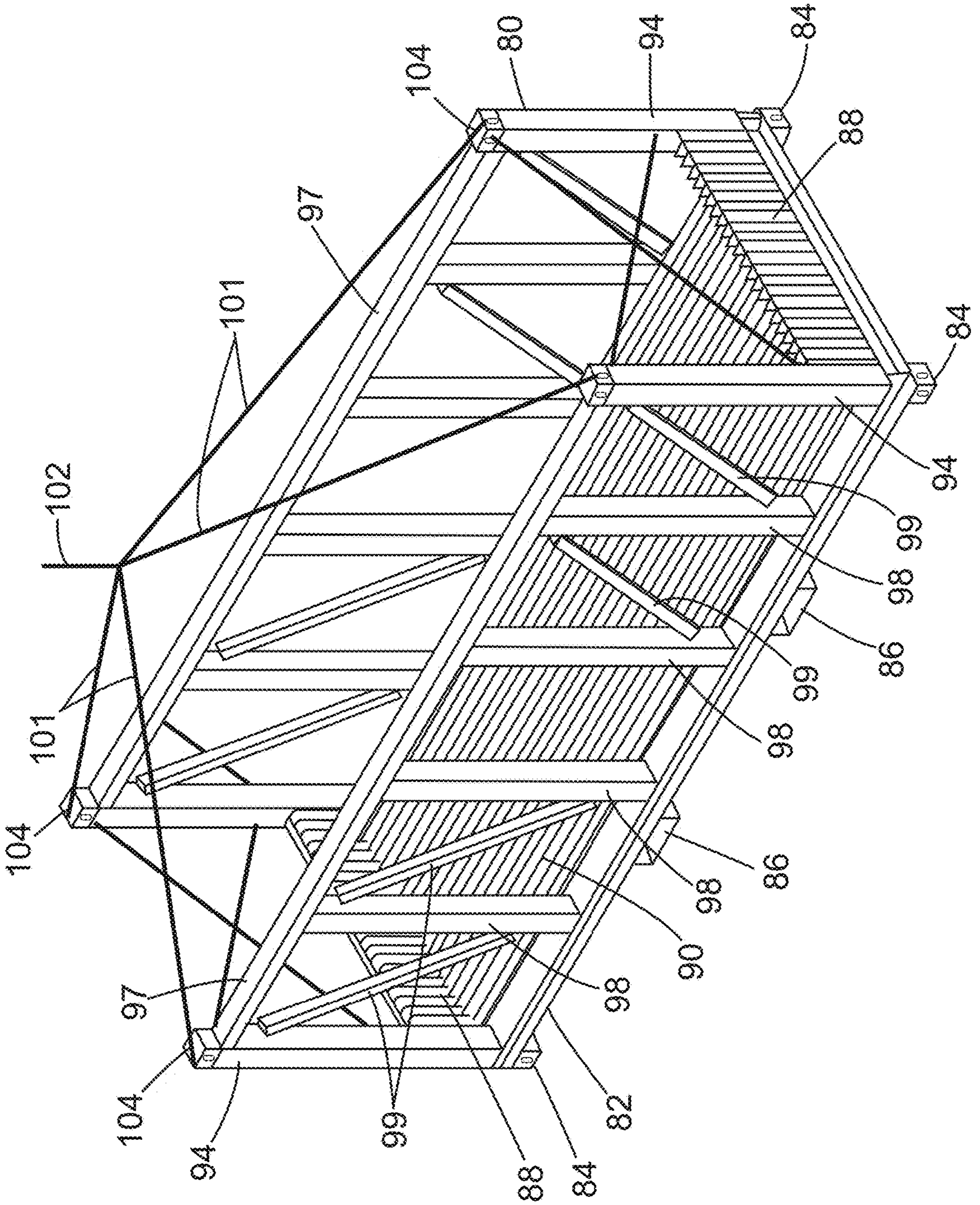

Upstanding corner posts 94 are braced by a strengthening framework 96 that extends along the long sides of the frame 80. The framework 96 includes horizontal beams 97, uprights 98 and angled braces 99, The bracing framework 96 braces the corner posts 94 along the long sides of the frame 80, while the channels 88 and bracing cross-members 100 brace the corner posts 94 along the short sides of the frame 80. The bracing cross-members 100 can be cables, that are connected by turnbuckles to adjust tension in the cross-members. The bracing arrangement of the frame 80 allows the frame 80 to be lifted in the manner shown in FIG. 13, in which lifting ropes or chains 101 connect to a central lifting rope or chain 102 which is attached to a crane or hoist or the like. The lifting ropes or chains 101 connect to the frame 80 at the top of the posts 94. The posts 94 include lifting lugs 104 for connection to the lifting ropes or chains 101. The horizontal beams 97 and the angled braces 99 can be removed when the composite panels 10 are being formed or removed from the frame 80 to increase access to the composite panels 10.

Figure 14:
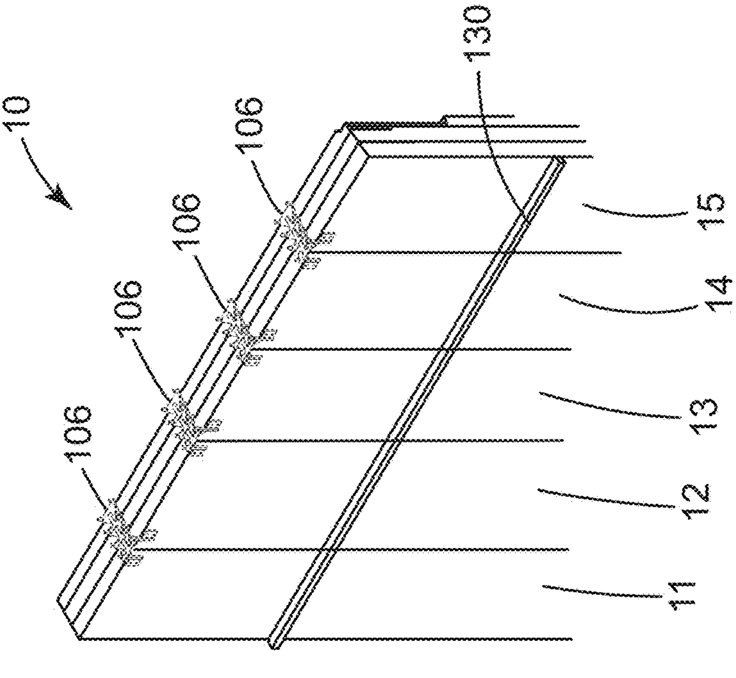
FIG. 14 illustrates a plurality of composite panels and spacers applied to space each composite panel from the other.

FIG. 14 is a perspective view of the composite panel 10 of the earlier figures but shows a plurality of brackets 106 applied along the top edge thereof at the joint or junction between individual panels 11 to 15. The brackets 106 are provided to secure multiple composite panels 10 within a frame 25 or 80. The brackets 106 protect the integrity of the glue connection between the adjacent panels 11-15 of the composite panels 10 by resisting flexing or pivoting movement of the panels 11-15 about the joint or junction between individual panels. The brackets 106 also ensure that adjacent composite panels 10 remain separated and upright during movement of the frame for transport of the composite panels 10 and so protect the composite panels 10 from damage. The brackets 106 are particularly useful to support the panels 12 to 14 of each composite panel 10 as those panels are not supported by the side edge channels 88. The brackets 106 are for use with composite panels 10 that each have the same height, for example 3000m.

Figure 15:
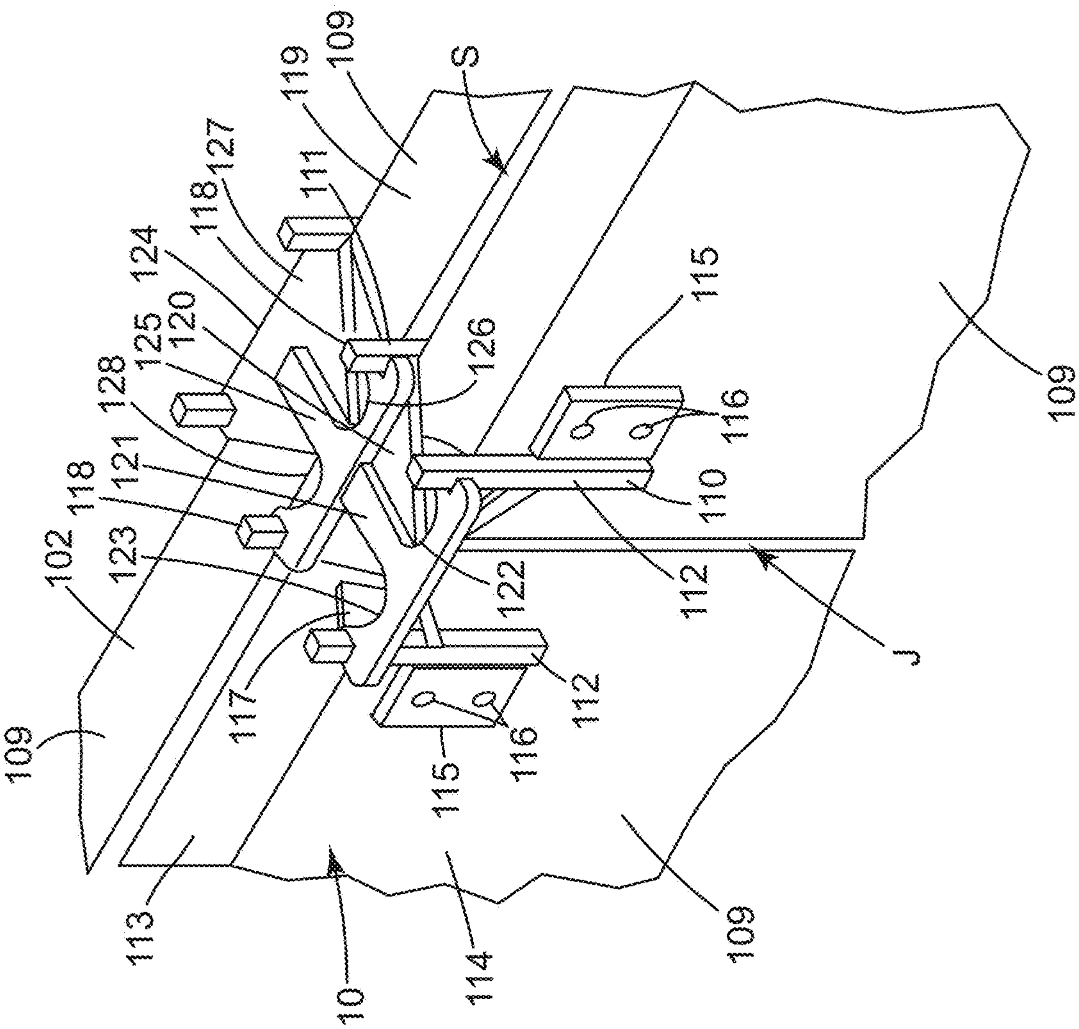
FIG. 15 shows the spacers of FIG. 14 in more detail.

The brackets 106 can comprise a pair of brackets as shown in FIG. 15 that are applied to the upper edges of corner sections of a pair of adjacent panels 109 that are part of a pair of composite panels $\mathbf{10}_1$ and $\mathbf{10}_2$. The brackets interlock as hereinafter described.

The brackets of FIG. 15 comprise a first row bracket 110 and a subsequent row bracket 111. The first row bracket 110 is positioned along the upper edge of the composite panel $\mathbf{10}_1$ which is the composite panel closest to one of the horizontal beams 97 of the frame 80, The first row bracket 110 is intended to be fixed to the adjacent horizontal beam 97. The subsequent row brackets 111 are intended to be attached to the subsequent composite panels 10 that extend to the opposite horizontal beam 97.

The bracket 110 includes a pair of legs 112 that extend downwardly from the upper edge 113 of the composite panel 101 to overlie the front face 114 of the composite panel 101 and plates 115 attached to the legs 112 have fastener openings 116 through which fasteners extend to fasten the legs 112 and thus the bracket 110 to the composite panel $\mathbf{10}_{1.}$ The bracket 110 further includes a top plate 117, that connects to the upper ends of the legs 112 and that extends along the upper edge 113 of the composite panel $\mathbf{10}_{1.}$ The bracket 111 interlocks with the bracket 110 and includes a pair of legs 118 that extend downwardly from the upper edges 113 and 119 of the composite panels $\mathbf{10}_1$ and $\mathbf{10}_2$ to define a space S between the composite panels 101 and 102. The legs 118 are connected to a plate 120 which bears against or rests on the upper edge 113 and a T-section 121 is attached to the plate 120. As shown, the leading edge 122 of the plate 120 inter-engages with a facing surface 123 of the top plate 117 of the bracket 110, while the T-section 121 inter-engages with an outside surface of the legs 112, This inter-engagement locks the brackets 110 and 111 together.

A third bracket 124 is illustrated in FIG. 15 but this bracket is the same as the bracket 111 and inter-engages with the bracket 111 by the T-section 125 engaging one surface of the legs 118 of the bracket 111 and by the leading edge 126 of the plate 127 inter-engaging with a facing surface 128 of the top plate 120 of the bracket 111. A further composite panel 10 can be added adjacent to the composite panel $\mathbf{10}_2$ and a further bracket 111 can inter-engage with the bracket 124. This process can continue until the frame 80 is filled with composite panels 10.

The brackets 110 and 111 stabilise the joint J between adjacent panels 109 and space the composite panels $\mathbf{10}_1$ and $\mathbf{10}_2$ apart.

FIG. 14 also shows a plate metal batten 130 which extends the full length of the composite panel 10, and such a batten 130 can be located between each adjacent composite panel 10 that is formed in the frame 80, The batten 130 is intended to be fixed to the next composite panel 10 that is yet to be formed against the three composite panels 10 that are shown in FIG. 14. To do this, the batten 130 is held temporarily against the composite panel 10 as shown, such as by adhesive tape, whereafter a new composite panel 10 is formed, Once the new composite panel 10 is formed, screw fasteners can be driven through the new composite panel 10 and into the base of the batten 130 to secure the batten 130 to the new composite panel 10, This takes place between each composite panel 10. The outermost composite panels 10 which are adjacent the horizontal beams 97 of the frame 80 can be fixed directly to the horizontal beams 97, by the horizontal beams 97 including brackets that fasteners extend through before entering the composite panel 10, The sequence can thus be to firstly form a composite panel 10 within the frame 80 and to fasten that composite panel 10 to one of the horizontal beams 97. Then, a batten 130 can be attached to the opposite side of that outermost composite panel 10, such as by adhesive tape, before a second composite panel 10 is formed in the frame 80 adjacent the outermost composite panel 10. This second composite panel 10 is separated from the outermost composite panel 10 by the batten 130 and by receipt of the bottom portion of the composite panels 10 within the channels 88 and 90 of the frame 80. Fasteners can be driven through the second composite panel 10 and into the batten 130 to secure the batten 130 to the second composite panel 10. The adhesive tape can remain in place, but it now serves no further purpose. A new batten 130 can be attached to the side of second composite panel 10, again such as by adhesive tape, before a third composite panel 10 is formed in the frame 80 adjacent the second composite panel 10. Fasteners can be driven through the third composite panel 10 and into the batten 130 between the second and third composite panels 10 to secure the batten 130 to the third composite panel 10. This sequence can continue until the frame 80 is filled with composite panels 10 all separated by battens 130 and each of the outermost composite panels are fastened to one of the horizontal beams 97.

A significant benefit of the above method of attaching battens 130 to the composite panels 10 as they are formed in the frame 80 is that those battens can be used in the fixing of composite panels 10 within a building framework. That is, battens are often used to attach composite panels to the studs of building framework and so the attachment of battens to the composite panels 10 as they are formed means that the subsequent attachment on site is not required.

Figure 16:
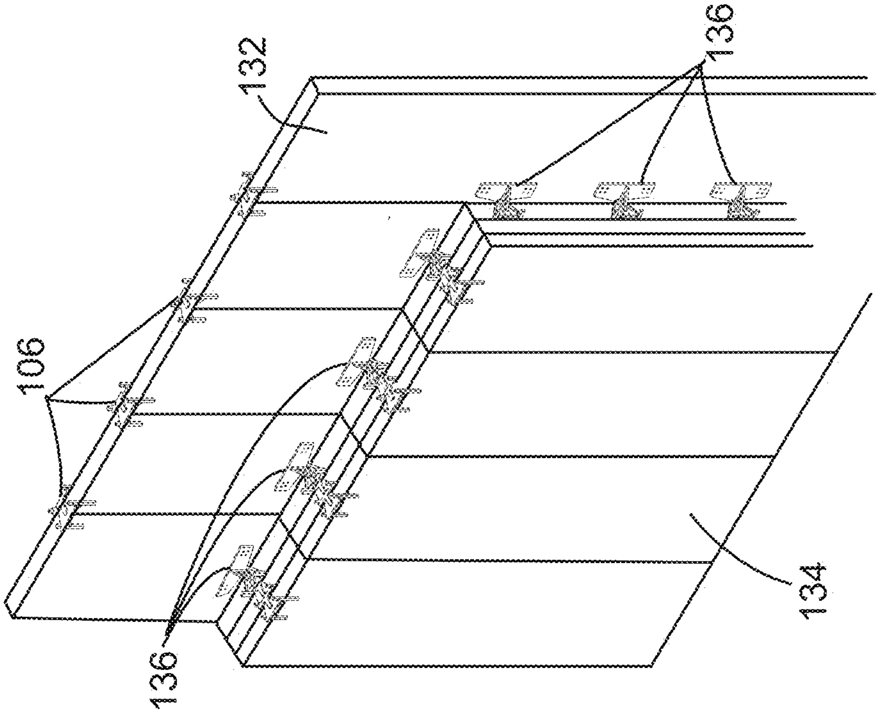
FIG. 16 illustrates a plurality of composite panels and spacers applied to space each composite panel from the other.

FIG. 16 is a perspective view of a composite panels 132 and 134. The composite panels 132 and 134 differ in height and in the number of panels that make up the respective composite panels, so that the composite panel 132 comprises five individual panels connected along adjacent edges, while the composite panels 134 comprise four edge connected panels. Also, the composite panel 134 has a reduced height compared to the composite panel 132. The arrangement illustrated in FIG. 16, illustrates how composite panels of differing height and width can be accommodated within frames such as frames 25 and 80 described earlier herein by the use of different brackets to those illustrated in FIG. 15.

Figure 18:
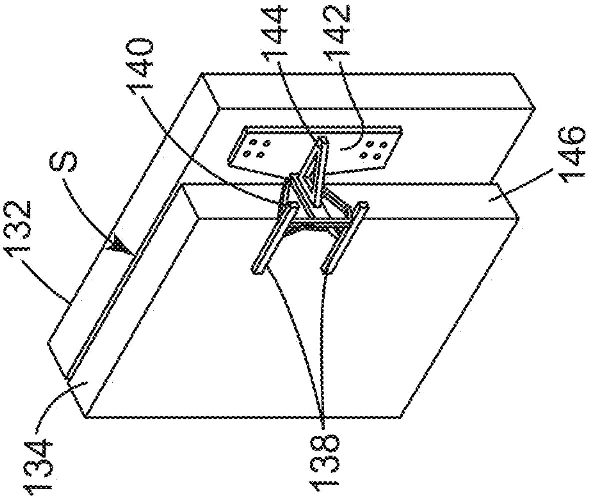
FIGS. 17 and 18 shows the spacers of FIG. 16 in more detail.
Figure 17:
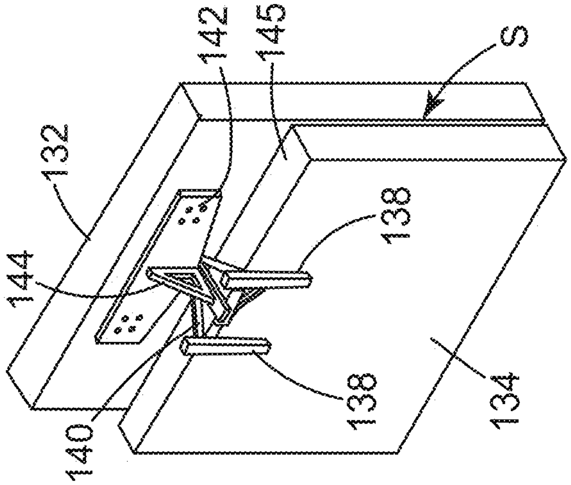

FIGS. 17 and 18 show brackets applied to top edges and side edges respectively of the composite panels 134 and these brackets 136 each include a pair of legs 138, a plate 140 and a spacer 142. Each of the legs 138, the plate 140 and the spacer 142 are connected together, such as by welding. A web 144 braces the connection between the plate 140 and the spacer 142.

The spacer 142 includes fastener openings 143 through which the fasteners can extend to penetrate into the composite panel 132 in order to fasten the bracket 136 in place.

As is evident from FIGS. 17 and 18, the plate 140 of the bracket 136 extends either along the upper edge 145 of the composite panel 134, or along the side edge 146 of the composite panel 134, As shown in FIGS. 17 and 18, positioning the spacer 142 between the composite panels 132 and 134 forms a space S between the composite panels for the same reasons as given in relation to the brackets 110 and 111 of FIG. 15.

The brackets 136 are, as explained above, for use with composite panels having different lengths and/or heights. In FIG. 16, the smaller sized composite panels 134 are positioned adjacent the larger sized composite panel 132. If other composite panels are supplied that have the same dimensions as the composite panel 132, the further brackets applied to the composite panel 132 and an adjacent composite panel can be connected by the same brackets 106 of FIG. 14, which are more specifically described and illustrated in FIG. 15.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A method for installing building panels, the method including;

forming a composite building panel from a plurality of panels, transporting the composite building panel to the site of installation and lifting the composite building panel by a lifting facility into position within a building, the lifting facility including a lifting bar that has a U shape to fit over and receive the top or upper edge region of the composite panel to attach across the top or upper edge region of the composite panel, the lifting bar having an elongate base and attachment members that extend from one or both elongate sides of the base and that have openings or perforations to receive screws for driving into the top or upper edge region of the composite panel to connect the lifting bar to the composite panel, the method step of lifting the composite building panel by said lifting facility into position within a building involving bringing the lifting bar into connection with the top or upper edge region of the composite panel and attaching the lifting bar to the top or upper edge region of the composite panel by screws driven through the openings or perforations of the attachment members and into the composite building panel, connecting or hitching the lifting bar to a crane or hoist and thereafter lifting the lifting bar and the composite building panel into position within a building.

2. A method according to claim 1, the composite building panel being formed by gluing at least a pair of panels and up to 10 panels together along facing side edges so that the panels are generally coplanar and allowing the glue to cure.

3. A method according to claim 1, the composite building panel being formed by arranging a first panel in a first position and arranging a second panel in a second position so that a side edge of the first panel is adjacent a side edge of the second panel and moving the second panel relative to the first panel to engage the adjacent side edges of the first and second panels so that the first and second panels are generally co-planar and maintaining the adjacent side edges of the first and second panels in contact so that a glue layer between the adjacent side edges can cure and connect the adjacent side edges together.

4. A method according to claim 3, including arranging a third panel in a third position so that a side edge of the third panel is adjacent a side edge of the second panel and moving the third panel relative to the second panel to engage the adjacent side edges of the second and third panels so that the second and third panels are generally co-planar and maintaining the adjacent side edges of the second and third panels in contact so that a glue layer between the adjacent side edges can cure and connect the adjacent side edges together.

5. A method according to claim 1, the composite panel being formed in racking that secures and guides the bottom edges of the panels used to form the composite panel, the racking enabling panels to be placed so that a side edge of one panel is adjacent a side edge of another panel and the racking guiding movement of the panels relative to each other to engage the adjacent side edges in an orientation in which the panels are generally co-planar to each other.

6. A method according to claim 5, the racking enabling a second composite panel to be formed generally parallel to and adjacent to a first formed composite panel, the second composite panel being formed by the same steps as the first composite panel.

7. A method according to claim 6, the racking enabling multiple further composite panels to be formed one after the other in generally parallel to and adjacent to each other, the further composite panels being formed by the same steps as the first and second composite panels.

8. A method according to claim 6, one or more spacing members being placed and fixed between adjacent composite panels to extend substantially the full length of the composite panels.

9. A method according to claim 8, the one or more spacing members being fixed in place against a composite panel by inserting screw fasteners that extend through the composite panel and into the spacing member.

10. A method according to claim 8, the one or more spacing members being elongate battens that are temporarily attached to one side of a first composite panel that is formed in the racking, before a second composite panel is formed, whereafter, the battens are secured to the second composite panel by inserting screw fasteners that extend through the second composite panel and into the batten.

11. A method according to claim 10, the elongate battens being temporarily attached to one side of a composite panel by adhesive tape.

12. A method according to claim 5, including positioning a first panel in the racking, positioning a second panel in the racking adjacent the first panel and moving the second panel relative to the first panel guided by the racking to engage the adjacent side edges of the first and second panels and maintaining the adjacent side edges of the first and second panels in contact so that a glue layer between the adjacent side edges can cure and connect the adjacent side edges together.

13. A method according to claim 12, including positioning a third panel in the racking adjacent the second panel and moving the third panel relative to the second panel guided by the racking to engage the adjacent side edges of the second and third panels and maintaining the adjacent side edges of the second and third panels in contact so that a glue layer between the adjacent side edges can cure and connect the adjacent side edges together.

14. A method according to claim 1, the screws being removed once the composite building panel is in position within a building.

15. A lifting bar for use in the method according to claim 1, the lifting bar having side walls depending from the base and the side walls having an internal spacing slightly greater than the thickness of the composite building panel that the lifting bar is to be used with and the attachment members extending from one or both of the side walls.

16. A lifting bar according to claim 15, the side walls including openings or perforations to receive screws for driving into the top or upper edge region of the composite panel.

* * * * *